3,016,401
NAPHTHALENE SEPARATION PROCESS
Murray G. Sturrock and Edwin L. Cline, Pittsburgh, and Kenneth R. Robinson, Pitcairn, and Robert J. Lovin, Glenshaw, Pa.; said Sturrock and said Cline assignors to Koppers Company, Inc., a corporation of Delaware
No Drawing. Filed Aug. 6, 1958, Ser. No. 753,403
7 Claims. (Cl. 260—523)

This invention relates to the separation of naphthalene from impurities which are naturally present therewith. In one specific aspect, it relates to the production of naphthalene containing less than about 0.2–0.3% by weight thianaphthene impurity. In a further aspect, it relates to an ozonation-hydrolysis technique for removing from naphthalene impurities, such as methyl coumarones and thianaphthene, and the production, as by-products, of valuable derivatives from naphthalene, such as o-phthalaldehyde and o-phthalaldehydic acid. In a still further aspect it relates to the separation of naphthalene from sulfur-containing impurities by completely converting it to o-phthalaldehyde and o-phthalaldehydic acid and separating the sulfur-containing impurities from these naphthalene derivatives.

Crude naphthalene, derived from coal tar and other sources, has admixed therewith appreciable amounts of impurities, including commercially undesirable sulfur-containing compounds such as thianaphthene. Thus, crude naphthalene must be refined to meet varying standards of purity, depending on its intended end use. Commercially, crude naphthalene is recovered from coal tar distillates by fractional distillation to give a product freezing at about 77° C. and containing about 94–96% by weight of pure naphthalene. Such a product is generally suitable for phthalic anhydride manufacture, which represents the principle industrial use of naphthalene. However, for certain end uses, such as in the production of betanaphthol, highly refined naphthalene having a minimum freezing point of 79.6° C. is required. Also, a substantially pure naphthalene, having a maximum thianaphthene content of about 0.2%, has been specified recently for use in a phthalic anhydride manufacturing process employing a catalyst that is readily poisoned by sulfur. A product of this high degree of purity cannot be obtained simply by fractional distillation.

Complete purification of naphthalene by crystallization from a variety of solvents has been attempted. Although such processes are effective in reducing the overall impurity content of crude naphthalene, they fail to effect substantially complete removal of either methyl coumarones or thianaphthene. U.S. Patent 2,711,432 describes a typical crystallization process. While that particular process is effective in producing a naphthalene having a freezing point of slightly over 79° C., the use of the process does not result in a naphthalene product substantially free of sulfur-containing impurities, in particular thianaphthene.

Naphthalene refining using sodium metal is very effective in the complete removal of thianaphthene, but the use of sodium results in the production of highly reactive residues which present a serious disposal problem. Peracetic acid is also effective in the removal of thianaphthene, but the cost of this reagent has limited its use to refining of naphthalene feedstocks from which most of the sulfur-containing impurities have been already removed by other physical and chemical means.

We have discovered a novel method for separating naphthalene from its impurities involving a combined ozonation-hydrolysis technique.

It is, therefore, an object of the present invention to provide a method for producing substantially pure naphthalene, having a minimum freezing point of about 80° C. and a maximum thianaphthene content of about 0.2–0.3% by weight, at greatly reduced cost. It is a further object of the invention to provide a method for making in good yield valuable derivatives from naphthalene, such as o-phthalaldehyde and o-phthalaldehydic acid, and for separating these materials from the impurities contained in a crude naphthalene feed.

In accordance with the invention, finely divided naphthalene is suspended in a medium comprising a lower aliphatic alcohol, which may contain a limited quantity of water. The naphthalene is then contacted with ozone to make ozonation products.

In one aspect of the invention, highly refined naphthalene is obtained as a product by limiting the amount of ozone used to one mol of ozone per mol of impurities in the feed, plus sufficient excess ozone to react with up to about 30% of the naphthalene. After ozonation is completed, the ozonation products are hydrolyzed in the presence of water by heating the reaction mixture. Methyl coumarones and thianaphthene are thereby completely converted into a form readily separable from naphthalene. The portion of the naphthalene that has reacted with ozone is converted in almost quantitative yields to the valuable oxygenated products, o-phthalaldehyde and o-phthalaldehydic acid, which are separately recovered as hereinafter described. The alcoholic medium is conveniently removed by distillation during the hydrolysis step. After hydrolysis and removal of the alcohol, the reaction mixture can be steam distilled to separate the steam-volatile naphthalene from the residual oxygenated products. Naphthalene is then recovered from the aqueous distillate and dried. The thianaphthene-free product may be further purified by fractional distillation. In lieu of steam distillation, the reaction mixture can simply be cooled to ambient temperatures and filtered.

In another aspect of the invention, crude naphthalene is reacted with sufficient ozone to completely convert all of the impurities and all of the naphthalene to oxygenated products. In this case, naphthalene is contacted with one mol of ozone per mol of impurities and at least two mols of ozone per mol of naphthalene. Hydrolysis of the ozonation products and removal of the alcoholic medium is effected as described hereabove. The principal product obtained by this method is o-phthalaldehydic acid. Minor amounts of o-phthalaldehyde are also formed. These useful products are separated and recovered by extraction with common organic solvents.

The method of the invention is applicable to any crude naphthalene derived from coal tar or from petroleum refining operations. Feedstocks having a relatively low thianaphthene content (e.g. those containing from 1 to 4% by weight) require a lesser degree of ozonation to convert completely this impurity to a product readily separable from naphthalene. Hence, treating feedstocks of relatively low thianaphthene content results in the production of greater quantities of substantially purified naphthalene and lesser quantities of o-phthalaldehydic acid and o-phthalaldehyde. If the naphthalene feedstock is extremely impure, it may be desirable to convert the naphthalene completely to o-phthalaldehyde and o-phthalaldehydic acid. These latter compounds are extremely useful as chemical intermediates in the production of dyes and other useful products as hereafter described. For the production of pure naphthalene by the method of the invention, a feed of commercial grade crude naphthalene having a freezing point of about 77° C. and containing about 3% by weight thianaphthene, is particularly suitable. The impurity content of the feed is determined by methods conventional in the art.

As we have already indicated, the solvent-suspension medium of the present invention consists essentially of an anhydrous lower aliphatic alcohol or a lower aliphatic alcohol in admixture with a limited quantity of water. Alcohols such as methyl alcohol, ethyl alcohol, isopropyl alcohol, tertiary-butyl alcohol, and n-amyl alcohol, are quite suitable. Generally, the amount of water present should not exceed about 15% by weight based upon the total weight of the medium. If a greater quantity of water is used, additional ozone is required to convert completely the sulfur-containing impurities to oxygenated products; hence ozone attack on the naphthalene is increased and less purified naphthalene is recovered as a final product. If it is desired to completely convert the naphthalene to its oxygenated derivatives, greater quantities of water, i.e. up to 80% by weight, can be used.

The concentration of crude naphthalene in the alcoholic medium can vary widely. The important consideration is to provide, after the precipitation of the finely divided naphthalene, a well-agitated suspension and thereby promote intimate contact between the ozone and the naphthalene. Generally, the medium contains between about 5 to 30% by weight naphthalene.

Naphthalene is conveniently suspended, with agitation, in the alcoholic medium and is dissolved by heating the medium to a temperature between the freezing point of the crude naphthalene (70–78° C.) and the boiling point of the particular alcohol or alcohol-water mixture used. The resulting solution is cooled to ambient temperatures to precipitate the naphthalene in finely divided form. Alternatively, crude naphthalene may be ground into a finely divided form, e.g. through 30 mesh (U.S. sieves), and then suspended in the alcoholic medium. The finely divided, crude naphthalene is constantly agitated during ozonation.

An oxygen-containing gas is used as a carrier for the ozone during the reaction. The type of gaseous carrier and the concentration of ozone therein depends upon the type of equipment used. Certain commercially available generators provide a stream of ozone in air in concentration ranging from 0.5–8% by weight. Others provide ozone in oxygen, the concentration of ozone being between 2 and 16% by weight. The entire gamut of ozone concentrations provided by either type of generating equipment is suitable for purposes of the invention.

It is of utmost importance to provide intimate contact between the ozone and the crude naphthalene. Conventional equipment may be used to disburse the ozone in the naphthalene suspension. It is preferable to introduce the ozone-containing gas in the form of small bubbles to insure intimacy of contact. The rate of ozone addition is determined by the ability of the naphthalene feedstock to absorb the ozone. It is, of course, commercially desirable to ozonize as rapidly as possible. Care should be taken to avoid a rate of ozone addition greater than the rate of absorption of the ozone by the reaction mixture. Usage of ozone in this manner is obviously wasteful. Moreover, explosive mixtures of gases may be formed in the equipment. The rate of ozone addition may be conveniently governed by an ozone meter placed downstream from the reaction mixture to determine whether all of the ozone added is being absorbed.

We have already indicated that the quantity of ozone used depends to a large extent upon the nature of the crude naphthalene feedstock, and particularly upon the amount of thianaphthene contained therein. One mol of ozone must be added for each mol of impurities present in the naphthalene feed. In addition, to completely purify the naphthalene, a certain amount of excess ozone must be added to the reaction mixture. If the thianaphthene content is as low as about 2%, the excess ozone added need only be an amount sufficient to react with up to about 20% of the naphthalene. Since two mols of ozone per mol of naphthalene are required to convert completely the naphthalene to its oxygenated derivatives, a 20% attack upon the naphthalene requires 0.4 mol of ozone per mol of naphthalene. If the crude feed contains from 2–4% thianaphthene, up to about a 30% attack upon the naphthalene is required to effect purification. In this case the excess ozone added represents about 0.6 mol of ozone per mol of naphthalene.

If the naphthalene feed is extremely impure, it may then be desirable to completely convert all of the naphthalene to o-phthalaldehyde and o-phthalaldehydic acid. In this case, the feed stock is reacted with one mol of ozone per mol of impurities and at least two mols of ozone per mol of naphthalene.

The reaction between ozone and the naphthalene feed is almost instantaneous. The reaction time will, therefore, depend upon the starting quantity of naphthalene feed and the intimacy of contact between the feed and the ozone. The reaction is continued until the desired quantity of ozone has been absorbed.

The reaction is conducted at atmospheric pressure (although higher or lower pressures can be used) over a temperature range of about −70 to 50° C. The lower limit is established by the freezing point of the particular alcoholic medium used. Operation at temperatures below those conveniently obtained with cooling water is possible, but generally the increased ozone solubility obtainable by this method cannot justify the high equipment costs involved. The upper limit is the boiling point of the alcoholic medium at the pressure used. It is less expensive, and therefore preferable, to conduct the reaction at ambient temperatures.

After ozonation has been completed, the ozonation products of the resulting mixture are hydrolyzed, generally in alkaline medium because the oxygenated derivatives from naphthalene are soluble therein. The medium may be conveniently made alkaline by adding, in aqueous solution, from 2–15% by weight of the medium of an alkali metal hydroxide or an alkali metal carbonate, such as sodium hydroxide, potassium hydroxide, lithium hydroxide, sodium carbonate, etc. If an anhydrous alcohol is used as a medium, water in an amount up to 100% by weight of the medium must be added to effect hydrolysis.

Hydrolysis and removal of the alcohol from the reaction medium are conveniently accomplished concomitantly. Thus, to hydrolyze the ozonation products of the present invention, the reaction mixture is heated to its boiling point, under reflux conditions if desired, preferably at atmospheric pressure. Since it is unnecessary to hydrolyze under total reflux, the alcohol of alcohol-water azeotrope (depending upon the particular alcohol used and/or the quantity of water added) is conveniently distilled over almost immediately after the reaction mixture is brought to the required temperature for hydrolysis. Hydrolysis and distillation can be accomplished under vacuum, but it is obviously preferable to work at atmospheric pressure because of equipment costs involved. Hydrolysis and distillation can be accomplished in separate steps by first hydrolyzing the ozonation products at temperatures somewhat below the boiling point of the reaction mixture (or under total reflux) and then distilling off the alcoholic medium. No particular advantage is seen in such a technique.

If the naphthalene feed has been contacted with sufficient ozone to attack only up to about 30% of the naphthalene, after ozonation, hydrolysis and removal of the alcohol, the resulting reaction mixture is conveniently subjected to steam distillation to separate the steam-volatile naphthalene from the oxygenated products of ozonation. If hydrolysis is conducted under neutral or acid conditions, the hydrolyzed mixture must be made alkaline as hereinbefore described to solubilize the oxygenated products before naphthalene recovery is attempted. Steam distillation is accomplished in a conventional manner, for example, by introducing steam under any pressure to the reaction mixture at atmospheric pressure and removing and condensing the steam containing the naphthalene. It is helpful to heat the reaction mixture to a temperature approximating its boiling point to avoid any condensation of the naphthalene-laden steam before it has been separated from the reaction mixture. The aqueous distillate is cooled and the naphthalene crystallizes therein. The crystals are removed by a simple filtration step or alternatively, by heating the distillate above about 80.3° C. (the freezing point of naphthalene), removing naphthalene as a liquid layer, and solidifying the liquid naphthalene by cooling. In lieu of steam distillation, the naphthalene may be separated from the hydrolyzed mixture by cooling the mixture to crystallize the naphthalene and separating the crystals by filtration. The naphthalene thus recovered is washed with water and dried to give a product substantially thianaphthene free (containing less than 0.2–0.3% by weight thianaphthene) having a melting point of about 79.2–79.5° C. If further purification to remove other impurities is desired, this product is subjected to a fractional distillation to produce a substantially pure naphthalene having a melting point of about 79.8 to about 80.2° C.

The oxygenated by-products of the naphthalene refining method of the invention remain as a residue after recovery of the naphthalene from the hydrolyzed ozonation mixture. The useful products represent about 90% by weight o-phthalaldehydic acid and about 10% by weight o-phthalaldehyde. We have already indicated that before the removal of naphthalene the reaction mixture either before or after hydrolysis must be made alkaline to solubilize the acidic oxygenated by-products so that naphthalene can readily be separated therefrom. Thus, the o-phthalaldehyde and o-phthalaldehydic acid are in solution in the hydrolyzed reaction mixture, the o-phthalaldehydric acid being present as its alkali metal salt.

Since the oxygenated methyl coumarones and thianaphthene are relatively insoluble in neutral solution, they may be separated from the useful products of the invention by adding to the alkaline mixture a sufficient quantity of a concentrated mineral acid such as hydrochloric acid to lower the pH of the mixture to between about 6 and 7. The o-phthalaldehydic acid and the o-phthalaldehyde remain in solution and the insoluble oxygenated products are readily separated by filtration.

After the removal of the undesirable oxygenated products, the reaction mixture is further acidified with a quantity of acid sufficient to completely convert all of the alkali metal salt of the o-phthalaldehydic acid to the free acid. The o-phthalaldehyde and o-phthalaldehydic acid are thereafter separated and recovered by solvent extraction using such common organic solvents as benzene, trichloroethylene, toluene, ethyl acetate, and the like.

If the crude naphthalene is contacted with sufficient ozone to convert all of the feed to oxygenated products, the hydrolysis need not be run in alkaline medium and further, there is no necessity for adding any alkaline reacting substance to the mixture, since the useful products in this case comprise entirely o-phthalaldehyde and o-phthalaldehydic acid. These products are recovered directly from the hydrolyzed mixture by the procedure outlined above.

o-Phthalaldehyde and o-phthalaldehydic acid are readily converted to the useful orthophalic acid by air oxidation. The commercial uses of orthophthalic acid in the field of plasticizers, resins, dyestuffs, and the like, are well-established.

o-Phthalaldehydic acid, as a solution of its alkali metal salt, may be reacted directly with hydrazine sulfate to convert it to phthalazone, which is precipitated from solution and is recovered by filtration. Phthalazone is reacted with nickel chloride, cuprous chloride, or aluminum chloride, to give pigments of excellent tinctorial strength which are similar in their properties and uses to the phthalocyanines. o-Phthalaldehyde undergoes a similar reaction with hydrazine sulfate.

Our invention is further illustrated by the following examples. The word "parts" as used in the examples means parts by weight.

Example I

Forty parts of commercial 77° naphthalene, a distillation fraction comprising about 94% naphthalene, 3.26% thianaphthene and about 2.7% other impurities were dissolved in 400 parts of anhydrous methanol with the aid of heat and stirring. The solution was then cooled to room temperature to form a slurry of fine crystals. An oxygen stream containing 8% ozone by weight was bubbled through the slurry at the rate of 0.57 l./min. until 6 parts of ozone had been absorbed. The excess ozone over the quantity required to react with all of the impurities present was sufficient to react with 30% of the naphthalene (at the rate of 2 mols ozone per mol of naphthalene). The ozonized solution was mixed with 200 ml. of aqueous 10% sodium hydroxide solution and heated to boiling in a flask equipped with a 12" Vigreux-type fractionating column. Methyl alcohol was removed by distillation. Hydrolysis of the ozonation products occurred during the distillation operation. After removal of the alcohol, purified naphthalene was steam distilled from the reaction mixture. The purified naphthalene was separated from the aqueous distillate by filtration and dried. The product melted at 79.4° C. and was found to be substantially free of thianaphthene when tested by the ultraviolet absorption method. Fractional distillation raised the melting point of the purified naphthalene to 80° C. The accepted melting point for pure naphthalene is 80.33° C.

The residual alkaline solution after removal of naphthalene by steam distillation contained the valuable oxygenated by-products derived from naphthalene. The alkaline solution was acidified with concentrated hydrochloric acid to a pH below 2 and extracted with ether. Upon evaporation of the ether, a crystalline solid was obtained. The solid assayed 85% o-phthalaldehydic acid when analyzed by the urea test. Urea reacts substantially quantitatively with o-phthalaldehydic acid to give 3-ureidophthalide.

Example II

Forty parts of crystallized naphthalene (M.P. 79.4° C., thianaphthene content 1.92%) suspended in 400 parts of anhydrous methanol was treated with ozone as in Example I, except that a total of 6 parts of ozone was used. The excess ozone was sufficient to react with 20% of the naphthalene present. The ozonation product was hydrolyzed and the methanol removed by distillation as in Example I. After removal of methanol, the residual material in the distillation flask was cooled to room temperature to crystallize the naphthalene, then filtered to separate the crystals. After fractional distillation the naphthalene had a melting point of 80.2° C. and was found free of thianaphthene.

The alkaline filtrate from the hydrolyzed ozonation product contained the oxygenated compounds derived from naphthalene. This filtrate was treated with hydrazine sulfate at room temperature, then heated to form phthalazone, which precipitated and was separated by filtration. Phthalazone is formed when a hydrazine salt is heated with a solution of the sodium salt of o-phthaladehydic acid.

Example III

Forty parts of crude naphthalene suspended in 400 parts of anhydrous methanol were treated with 7.5 parts of ozonized oxygen containing 8% ozone by weight. The excess ozone was sufficient to attack 23% of the naphthalene present. The ozonation product was mixed with 200 parts of sodium carbonate solution containing 20 parts of sodium carbonate. Hydrolysis and distillation to remove methanol were conducted as in Example I. Naphthalene, recovered by steam distillation, had a thianaphthene content of 0.23.

Example IV

The commercial crude naphthalene employed in Example I was ozonized in a mixture of tertiary-butyl alcohol (88%) and water (12%). Forty parts of naphthalene were suspended in 400 parts of a mixture comprising 352 parts tertiary-butyl alcohol and 48 parts water. Ozonation was carried out as in Example I, that is, the quantity of ozone was equivalent to 10 mols per mol of impurities which left excess ozone sufficient to attack 30% of the naphthalene present. Subsequent steps were carried out as in Example I. The purified naphthalene had a melting point of 79.8° C. and was found free of thianaphthene when tested by the ultraviolet absorption procedure.

Example V

The crude naphthalene was the same as had been used in Example I. Solvent was a mixture of 200 g. water and 200 g. of tertiary-butyl alcohol, quantity of ozone used and procedure in the subsequent steps was the same as in Example I. The recovered naphthalene had a melting point of 79.6° C. and a thianaphthene content of 0.49%.

Example VI

The commercial crude naphthalene employed in Example I was ozonized in a mixture of tertiary-butyl alcohol (88%) and water (12%). Forty parts of naphthalene were suspended in 400 parts of a mixture comprising 352 parts tertiary-butyl alcohol and 48 parts water. An ozone-containing gas stream was bubbled through the suspension until one mol of ozone per mol of impurities had been added. Subsequent steps were carried out as in Example I. The product had a thianaphthene content of 2.30%. This example clearly illustrates that excess ozone must be used to completely separate the thianaphthene.

Example VII

The procedure of Example VI was followed with the exception that excess ozone sufficient to react with 10.9% of the naphthalene was used. The resulting product had a thianaphthene content of 0.69%. The experiment was repeated using sufficient ozone to attach 14.1% of the naphthalene. The resulting product had a thianaphthene content of 0.35%. It can be seen that with this particular feed and ozonation medium about 15% ozone attack on the naphthalene is required to reduce the thianaphthene content to the necessary low level.

We claim:

1. Method of separating naphthalene from impurities, including sulfur-containing impurities, comprising suspending finely divided crude naphthalene containing such impurities in a medium comprising a lower aliphatic alcohol, intimately contacting said crude naphthalene with ozone in an amount equal to one mol of ozone per mol of impurities and up to 0.6 mol of ozone per mol of naphthalene to form ozonation products, subjecting said ozonation products to alkaline hydrolysis by rendering the reaction mixture alkaline and heating the reaction mixture, removing said alcohol from said reaction mixture by distillation and separating the naphthalene from the reaction mixture.

2. Method of separating naphthalene from impurities, including sulfur-containing impurities, comprising dissolving crude naphthalene containing such impurities in a medium comprising a lower aliphatic alcohol, cooling the resulting solution to precipitate crude naphthalene in finely divided form, intimately contacting said crude naphthalene with ozone in an amount equal to one mol of ozone per mol of impurities and up to 0.6 mol of ozone per mol of naphthalene to form ozonation products, subjecting said ozonation products to hydrolysis by rendering the ozonized mixture alkaline and heating the alkaline mixture to a temperature approximating its boiling point, removing said alcohol from said alkaline mixture by distillation and separating the naphthalene from the reaction mixture.

3. Method of separating naphthalene from impurities including thianaphthene comprising dissolving crude naphthalene in admixture with said impurities in a medium consisting essentially of a lower aliphatic alcohol in admixture with up to 15% by weight water based on the total weight of the medium, cooling the resulting solution to precipitate crude naphthalene in finely divided form, intimately contacting said crude naphthalene with ozone in an amount equal to one mol of ozone per mol of impurities and up to 0.6 mol of ozone per mol of naphthalene to form ozonation products, subjecting said ozonation products to hydrolysis by rendering the ozonized mixture alkaline and heating the alkaline mixture to a temperature approximating its boiling point, concomitantly removing the alcoholic medium by distillation, separating naphthalene which is substantially thianaphthene-free from the hydrolyzed mixture by steam distillation, recovering said naphthalene from the distillate and subjecting the recovered naphthalene to fractional distillation.

4. Method according to claim 3 wherein the medium comprises 88% by weight tertiary butyl alcohol and 12% by weight water.

5. Method according to claim 3 wherein the ozonized mixture is rendered alkaline by the addition of 5–10% by weight of sodium hydroxide in aqueous solution.

6. Method according to claim 3 wherein the crude naphthalene contains from 2 to 4% by weight thianaphthene.

7. Method of concomitantly purifying naphthalene and making o-phthalaldehydic acid and o-phthaladehyde comprising dissolving 5 to 30% by weight crude naphthalene in admixture with sulfur-containing impurities in a medium comprising a lower aliphatic alcohol, cooling the resulting solution to precipitate naphthalene in finely divided form, intimately contacting said crude naphthalene with an ozone-containing gas stream in an amount equal to one mol of ozone per mol of impurities and up to 0.6 mol of ozone per mol of naphthalene to form ozonation products, subjecting said ozonation products to hydrolysis in the presence of water and from 2 to 15% by weight of an alkaline reacting substance selected from the group consisting of alkali metal carbonates and alkali metal hydroxides by heating the aqueous alkaline mixture to its boiling point, concomitantly removing said alcohol from said mixture by distillation, separating naphthalene which is substantially free of said sulfur-containing impurities from the hydrolyzed mixture by steam distillation, recovering said naphthalene from said distillate, and recovering o-phthalaldehydic acid and o-phthalaldehyde from the residue of said hydrolyzed mixture by solvent extraction.

References Cited in the file of this patent

UNITED STATES PATENTS

| | | |
|---|---|---|
| 1,590,965 | Downs | June 29, 1926 |
| 2,321,117 | Wilcock | June 8, 1943 |
| 2,779,722 | Murray et al. | Jan. 29, 1957 |

OTHER REFERENCES

Seekles: Chem. Absts., vol. 17, p. 2572 (1923).
Seekles: Rec. Trav. Chim., vol. 42, pages 706–709 (1923).
Rodd: Chemistry of Carbon Compounds, vol. IIIB, pages 834–5 (1956).

UNITED STATES PATENT OFFICE
CERTIFICATE OF CORRECTION

Patent No. 3,016,401                     January 9, 1962

Murray G. Sturrock et al.

It is hereby certified that error appears in the above numbered patent requiring correction and that the said Letters Patent should read as corrected below.

In the grant, lines 1 to 5, for "Murray G. Sturrock and Edwin L. Cline, of Pittsburgh, and Kenneth R. Robinson, of Pitcairn, and Robert J. Lovin, of Glenshaw, Pennsylvania; said Sturrock and said Cline assignors to Koppers Company, Inc., a corporation of Delaware," read -- Murray G. Sturrock and Edwin L. Cline, of Pittsburgh, and Kenneth R. Robinson, of Pitcairn, and Robert J. Lovin, of Glenshaw, Pennsylvania, assignors to Koppers Company, Inc., a corporation of Delaware, --; lines 14 and 15, for "Koppers Company, Inc., its successors or assigns, and Robert J. Lovin, his heirs" read -- Koppers Company, Inc., its successors --; in the heading to the printed specification, lines 3 to 6, for "Murray G. Sturrock and Edwin L. Cline, Pittsburgh, and Kenneth R. Robinson, Pitcairn, and Robert J. Lovin, Glenshaw, Pa; said Sturrock and said Cline assignors to Koppers Company, Inc., a corporation of Delaware" read -- Murray G. Sturrock and Edwin L. Cline, Pittsburgh, and Kenneth R. Robinson, Pitcairn, and Robert J. Lovin, Glenshaw, Pa., assignors to Koppers Company, Inc., a corporation of Delaware --.

Signed and sealed this 15th day of May 1962.

(SEAL)
Attest:

ERNEST W. SWIDER                                DAVID L. LADD

Attesting Officer                                 Commissioner of Patents